United States Patent
Du et al.

(10) Patent No.: US 12,289,328 B2
(45) Date of Patent: Apr. 29, 2025

(54) MULTI-DIMENSIONAL PERIODICITY DETECTION OF IOT DEVICE BEHAVIOR

(71) Applicant: Palo Alto Networks, Inc., Santa Clara, CA (US)

(72) Inventors: Jun Du, Cupertino, CA (US); Mei Wang, Saratoga, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 16/653,898

(22) Filed: Oct. 15, 2019

(65) Prior Publication Data

US 2020/0120122 A1    Apr. 16, 2020

Related U.S. Application Data

(60) Provisional application No. 62/745,757, filed on Oct. 15, 2018.

(51) Int. Cl.
H04L 9/40    (2022.01)

(52) U.S. Cl.
CPC ...... H04L 63/1425 (2013.01); H04L 63/1416 (2013.01)

(58) Field of Classification Search
None
See application file for complete search history.

(56) References Cited

U.S. PATENT DOCUMENTS

| | | | |
|---|---|---|---|
| 6,142,682 A | 11/2000 | Skogby | |
| 6,877,146 B1 | 4/2005 | Teig | |
| 8,146,133 B2 | 3/2012 | Moon | |
| 8,159,966 B1 | 4/2012 | Mabee | |
| 8,331,229 B1 | 12/2012 | Hu | |
| 8,671,099 B2 | 3/2014 | Kapoor | |
| 8,683,598 B1 | 3/2014 | Cashin | |
| 8,850,588 B2 | 9/2014 | Kumar | |
| 8,863,276 B2 | 10/2014 | Giblin | |
| 8,874,550 B1 | 10/2014 | Soubramanien | |
| 8,891,528 B2 | 11/2014 | Moriarty | |
| 8,898,788 B1 | 11/2014 | Aziz | |
| 8,973,088 B1 | 3/2015 | Leung | |

(Continued)

FOREIGN PATENT DOCUMENTS

| | | |
|---|---|---|
| CA | 2904463 | 10/2020 |
| CN | 101719899 | 6/2010 |

(Continued)

OTHER PUBLICATIONS

Nassif, A.B., Talib, M.A., Nasir, Q. and Dakalbab, F.M., 2021. Machine learning for anomaly detection: A systematic review. Ieee Access, 9, pp. 78658-78700. (Year: 2021).*

(Continued)

*Primary Examiner* — Luu T Pham
*Assistant Examiner* — Edward X Long
(74) *Attorney, Agent, or Firm* — Van Pelt, Yi & James LLP

(57) ABSTRACT

Techniques for detecting anomalous behavior of an Internet-of-Things (IoT) device in an IoT network. IoT events of an IoT device are captured and analyzed to identify periodic activities of the IoT device. The periodic activities of the IoT device are tracked over time, and variations in the periodic activities are analyzed to assess potential threats to the IoT network.

16 Claims, 8 Drawing Sheets

(56) References Cited

U.S. PATENT DOCUMENTS

| | | |
|---|---|---|
| 9,112,895 B1 | 8/2015 | Lin |
| 9,324,119 B2 | 4/2016 | Singh |
| 9,378,361 B1 | 6/2016 | Yen |
| 9,516,053 B1 | 12/2016 | Muddu |
| 9,548,987 B1 | 1/2017 | Poole |
| 9,584,536 B2 | 2/2017 | Nantel |
| 9,600,571 B2 | 3/2017 | Shaashua |
| 9,609,003 B1 | 3/2017 | Chmielewski |
| 9,614,742 B1 | 4/2017 | Zhang |
| 9,661,011 B1 | 5/2017 | Van Horenbeeck |
| 9,692,784 B1 | 6/2017 | Nenov |
| 9,774,604 B2 | 9/2017 | Zou |
| 9,800,603 B1 | 10/2017 | Sidagni |
| 9,807,110 B2 | 10/2017 | Harlacher |
| 9,891,907 B2 | 2/2018 | Searle |
| 9,894,085 B1 | 2/2018 | Dmitriyev |
| 9,910,874 B1 | 3/2018 | Jamail |
| 9,961,096 B1 | 5/2018 | Pierce |
| 9,984,344 B2 | 5/2018 | Singh |
| 10,038,700 B1 | 7/2018 | Duchin |
| 10,043,591 B1 | 8/2018 | Laborde |
| 10,122,747 B2 | 11/2018 | Mahaffey |
| 10,129,118 B1 | 11/2018 | Ghare |
| 10,191,794 B2 | 1/2019 | Smith |
| 10,204,312 B2 | 2/2019 | Singh |
| 10,212,176 B2 | 2/2019 | Wang |
| 10,212,178 B2 | 2/2019 | Cheng |
| 10,229,269 B1 | 3/2019 | Patton |
| 10,237,875 B1 | 3/2019 | Romanov |
| 10,320,613 B1 | 6/2019 | Cam-Winget |
| 10,348,739 B2 | 7/2019 | Greenspan |
| 10,459,827 B1 | 10/2019 | Aghdaie |
| 10,489,361 B2 | 11/2019 | Sisk |
| 10,489,714 B2 | 11/2019 | Lee |
| 10,511,620 B2 | 12/2019 | Schwartz |
| 10,623,389 B2 | 4/2020 | Childress |
| 10,630,728 B2 | 4/2020 | Ghosh |
| 10,764,315 B1 | 9/2020 | Carroll |
| 10,862,911 B2 | 12/2020 | Dezent |
| 10,885,393 B1 | 1/2021 | Sirianni |
| 10,887,306 B2 | 1/2021 | Gupta |
| 11,005,839 B1 | 5/2021 | Shahidzadeh |
| 11,070,568 B2 | 7/2021 | Ektare |
| 11,115,799 B1 | 9/2021 | Du |
| 11,115,823 B1 | 9/2021 | Heiland |
| 11,310,247 B2 | 4/2022 | Manadhata |
| 11,455,641 B1 | 9/2022 | Shahidzadeh |
| 11,477,202 B2 | 10/2022 | De Knijf |
| 2004/0243835 A1 | 12/2004 | Terzis |
| 2005/0044406 A1 | 2/2005 | Stute |
| 2005/0281291 A1 | 12/2005 | Stolfo |
| 2006/0095970 A1 | 5/2006 | Rajagopal |
| 2006/0265397 A1 | 11/2006 | Bryan |
| 2007/0094725 A1 | 4/2007 | Borders |
| 2008/0059536 A1 | 3/2008 | Brock |
| 2009/0180391 A1 | 7/2009 | Petersen |
| 2010/0054278 A1 | 3/2010 | Stolfo |
| 2010/0284282 A1 | 11/2010 | Golic |
| 2011/0022812 A1 | 1/2011 | Van Der Linden |
| 2011/0087626 A1 | 4/2011 | Yeleshwarapu |
| 2011/0239267 A1 | 9/2011 | Lyne |
| 2012/0065749 A1 | 3/2012 | Hunter |
| 2012/0102543 A1 | 4/2012 | Kohli |
| 2012/0174221 A1 | 7/2012 | Han |
| 2012/0240185 A1 | 9/2012 | Kapoor |
| 2013/0086261 A1 | 4/2013 | Lim |
| 2013/0173621 A1 | 7/2013 | Kapoor |
| 2013/0247190 A1 | 9/2013 | Spurlock |
| 2013/0305357 A1 | 11/2013 | Ayyagari |
| 2013/0305358 A1 | 11/2013 | Gathala |
| 2014/0006479 A1 | 1/2014 | Maloo |
| 2014/0157405 A1 | 6/2014 | Joll |
| 2014/0244834 A1 | 8/2014 | Guedalia |
| 2014/0281912 A1 | 9/2014 | Doi |
| 2014/0325670 A1 | 10/2014 | Singh |
| 2014/0337862 A1 | 11/2014 | Valencia |
| 2015/0039513 A1 | 2/2015 | Adjaoute |
| 2015/0055623 A1 | 2/2015 | Li |
| 2015/0161024 A1 | 6/2015 | Gupta |
| 2015/0199610 A1 | 7/2015 | Hershberg |
| 2015/0229654 A1 | 8/2015 | Perier |
| 2015/0256431 A1 | 9/2015 | Buchanan |
| 2015/0262067 A1 | 9/2015 | Sridhara |
| 2015/0271192 A1 | 9/2015 | Crowley |
| 2015/0293954 A1 | 10/2015 | Hsiao |
| 2015/0295945 A1* | 10/2015 | Canzanese, Jr. ........ G06F 21/55 726/23 |
| 2015/0324559 A1 | 11/2015 | Boss |
| 2015/0356451 A1 | 12/2015 | Gupta |
| 2016/0006815 A1 | 1/2016 | Dong |
| 2016/0028750 A1 | 1/2016 | Di Pietro |
| 2016/0036819 A1 | 2/2016 | Zehavi |
| 2016/0048984 A1 | 2/2016 | Frigo |
| 2016/0119372 A1 | 4/2016 | Borlick |
| 2016/0128043 A1 | 5/2016 | Shuman |
| 2016/0164721 A1 | 6/2016 | Zhang |
| 2016/0173446 A1 | 6/2016 | Nantel |
| 2016/0173495 A1 | 6/2016 | Joo |
| 2016/0182497 A1 | 6/2016 | Smith |
| 2016/0196558 A1 | 7/2016 | Mercille |
| 2016/0210556 A1 | 7/2016 | Ben Simhon |
| 2016/0212099 A1 | 7/2016 | Zou |
| 2016/0218949 A1 | 7/2016 | Dasgupta |
| 2016/0261465 A1 | 9/2016 | Gupta |
| 2016/0267406 A1 | 9/2016 | Bodo |
| 2016/0267408 A1 | 9/2016 | Singh |
| 2016/0277435 A1 | 9/2016 | Salajegheh |
| 2016/0301707 A1 | 10/2016 | Cheng |
| 2016/0301717 A1 | 10/2016 | Dotan |
| 2016/0337127 A1 | 11/2016 | Schultz |
| 2016/0352685 A1 | 12/2016 | Park |
| 2016/0366141 A1 | 12/2016 | Smith |
| 2016/0366181 A1 | 12/2016 | Smith |
| 2016/0381030 A1 | 12/2016 | Chillappa |
| 2017/0006028 A1 | 1/2017 | Tunnell |
| 2017/0006135 A1 | 1/2017 | Siebel |
| 2017/0011406 A1 | 1/2017 | Tunnell |
| 2017/0013005 A1 | 1/2017 | Galula |
| 2017/0055913 A1 | 3/2017 | Bandyopadhyay |
| 2017/0063774 A1 | 3/2017 | Chen |
| 2017/0063889 A1 | 3/2017 | Muddu |
| 2017/0063905 A1 | 3/2017 | Muddu |
| 2017/0085580 A1 | 3/2017 | Thanos |
| 2017/0093915 A1 | 3/2017 | Ellis |
| 2017/0118237 A1 | 4/2017 | Devi Reddy |
| 2017/0118240 A1 | 4/2017 | Devi Reddy |
| 2017/0124660 A1 | 5/2017 | Srivastava |
| 2017/0126704 A1 | 5/2017 | Nandha Premnath |
| 2017/0149813 A1 | 5/2017 | Wright |
| 2017/0180380 A1 | 6/2017 | Bagasra |
| 2017/0180399 A1 | 6/2017 | Sukhomlinov |
| 2017/0188242 A1 | 6/2017 | Ghosh |
| 2017/0200061 A1 | 7/2017 | Julian |
| 2017/0214701 A1 | 7/2017 | Hasan |
| 2017/0230402 A1 | 8/2017 | Greenspan |
| 2017/0232300 A1 | 8/2017 | Tran |
| 2017/0235585 A1 | 8/2017 | Gupta |
| 2017/0235783 A1 | 8/2017 | Chen |
| 2017/0242414 A1 | 8/2017 | Coote |
| 2017/0244737 A1 | 8/2017 | Kuperman |
| 2017/0251007 A1 | 8/2017 | Fujisawa |
| 2017/0272554 A1 | 9/2017 | Kwan |
| 2017/0279685 A1 | 9/2017 | Mota |
| 2017/0289184 A1* | 10/2017 | C ........................ H04L 63/1425 |
| 2017/0331671 A1 | 11/2017 | Olsson |
| 2017/0331906 A1 | 11/2017 | Choi |
| 2017/0339178 A1 | 11/2017 | Mahaffey |
| 2017/0344407 A1 | 11/2017 | Jeon |
| 2017/0346677 A1 | 11/2017 | Suryanarayana |
| 2018/0007055 A1 | 1/2018 | Infante-Lopez |
| 2018/0007058 A1 | 1/2018 | Zou |
| 2018/0012227 A1 | 1/2018 | Tunnell |
| 2018/0018684 A1 | 1/2018 | Orr |
| 2018/0027006 A1 | 1/2018 | Zimmermann |

(56) References Cited

U.S. PATENT DOCUMENTS

| | | |
|---|---|---|
| 2018/0027020 A1 | 1/2018 | Pallas |
| 2018/0039555 A1 | 2/2018 | Salunke |
| 2018/0078843 A1 | 3/2018 | Tran |
| 2018/0115574 A1 | 4/2018 | Ridley |
| 2018/0117446 A1 | 5/2018 | Tran |
| 2018/0117447 A1 | 5/2018 | Tran |
| 2018/0124096 A1 | 5/2018 | Schwartz |
| 2018/0139227 A1 | 5/2018 | Martin |
| 2018/0144139 A1 | 5/2018 | Cheng |
| 2018/0173881 A1 | 6/2018 | Oberheide |
| 2018/0191729 A1 | 7/2018 | Whittle |
| 2018/0191746 A1 | 7/2018 | De Knijf |
| 2018/0191755 A1 | 7/2018 | Monaco |
| 2018/0191848 A1 | 7/2018 | Bhattacharya |
| 2018/0205793 A1 | 7/2018 | Loeb |
| 2018/0212768 A1 | 7/2018 | Kawashima |
| 2018/0234302 A1 | 8/2018 | James |
| 2018/0234519 A1 | 8/2018 | Boyapalle |
| 2018/0248902 A1 | 8/2018 | Dănilă-Dumitrescu |
| 2018/0255084 A1 | 9/2018 | Kotinas |
| 2018/0261070 A1 | 9/2018 | Stevens |
| 2018/0264347 A1 | 9/2018 | Tran |
| 2018/0285234 A1 | 10/2018 | Degaonkar |
| 2018/0293387 A1 | 10/2018 | Bar-El |
| 2018/0295148 A1 | 10/2018 | Mayorgo |
| 2018/0302440 A1 | 10/2018 | Hu |
| 2018/0349598 A1 | 12/2018 | Harel |
| 2018/0349612 A1 | 12/2018 | Harel |
| 2018/0351972 A1 | 12/2018 | Yu |
| 2018/0357556 A1 | 12/2018 | Rai |
| 2018/0375887 A1* | 12/2018 | Dezent ............... H04L 43/08 |
| 2019/0014169 A1 | 1/2019 | Chung |
| 2019/0019249 A1 | 1/2019 | Bhattacharjee |
| 2019/0081961 A1 | 3/2019 | Bansal |
| 2019/0089747 A1 | 3/2019 | Wang |
| 2019/0098028 A1 | 3/2019 | Ektare |
| 2019/0098058 A1 | 3/2019 | Ikegami |
| 2019/0109717 A1 | 4/2019 | Reddy |
| 2019/0121978 A1 | 4/2019 | Kraemer |
| 2019/0138512 A1 | 5/2019 | Pourmohammad |
| 2019/0182278 A1* | 6/2019 | Das ............... H04W 4/70 |
| 2019/0253319 A1 | 8/2019 | Kampanakis |
| 2019/0268267 A1 | 8/2019 | Pignataro |
| 2019/0268305 A1 | 8/2019 | Xu |
| 2019/0296979 A1 | 9/2019 | Gupta |
| 2019/0349426 A1 | 11/2019 | Smith |
| 2019/0361917 A1 | 11/2019 | Tran |
| 2019/0373007 A1 | 12/2019 | Salunke |
| 2019/0373472 A1 | 12/2019 | Smith |
| 2019/0387399 A1 | 12/2019 | Weinberg |
| 2020/0036603 A1 | 1/2020 | Nieves |
| 2020/0074085 A1 | 3/2020 | Cheng |
| 2020/0076846 A1 | 3/2020 | Pandian |
| 2020/0076853 A1 | 3/2020 | Pandian |
| 2020/0117690 A1 | 4/2020 | Tran |
| 2020/0156654 A1 | 5/2020 | Boss |
| 2020/0162278 A1 | 5/2020 | Delaney |
| 2020/0162503 A1 | 5/2020 | Shurtleff |
| 2020/0177485 A1 | 6/2020 | Shurtleff |
| 2020/0177589 A1 | 6/2020 | Mangalvedkar |
| 2020/0195679 A1 | 6/2020 | Du |
| 2020/0211721 A1 | 7/2020 | Ochoa |
| 2020/0213146 A1 | 7/2020 | Kodam |
| 2020/0285457 A1 | 9/2020 | Meriac |
| 2020/0285997 A1 | 9/2020 | Bhattacharyya |
| 2020/0409957 A1 | 12/2020 | Zhang |
| 2021/0058430 A1 | 2/2021 | Novak |
| 2021/0203615 A1 | 7/2021 | Roy |
| 2021/0360406 A1 | 11/2021 | Heiland |
| 2022/0060491 A1 | 2/2022 | Achleitner |
| 2022/0086071 A1 | 3/2022 | Sivaraman |
| 2022/0138634 A1 | 5/2022 | Covell |
| 2022/0159020 A1 | 5/2022 | Wang |
| 2022/0210065 A1 | 6/2022 | Khanna |
| 2022/0210066 A1 | 6/2022 | Khanna |
| 2023/0049886 A1 | 2/2023 | Sesha |

FOREIGN PATENT DOCUMENTS

| | | |
|---|---|---|
| CN | 102025577 | 7/2012 |
| CN | 102291430 | 11/2013 |
| CN | 107862468 | 3/2018 |
| CN | 104837158 | 5/2018 |
| CN | 108650133 | 10/2018 |
| CN | 105659633 | 4/2020 |
| CN | 107135093 | 5/2020 |
| CN | 108306911 | 12/2020 |
| EP | 3136297 | 3/2017 |
| EP | 3576373 | 12/2019 |
| JP | 2018513467 | 5/2018 |
| JP | 2020503784 | 1/2020 |
| KR | 20170059546 | 5/2017 |
| WO | 2019218874 | 11/2019 |

OTHER PUBLICATIONS

Fahim, M. and Sillitti, A., 2019. Anomaly detection, analysis and prediction techniques in iot environment: A systematic literature review. IEEE Access, 7, pp. 81664-81681. (Year: 2019).*

Liu, Y., Dillon, T., Yu, W., Rahayu, W. and Mostafa, F., 2020. Noise removal in the presence of significant anomalies for industrial ioT sensor data in manufacturing. IEEE Internet of Things Journal, 7(8), pp. 7084-7096. (Year: 2020).*

Pahl, M.O. and Aubet, F.X., 2018, November. All eyes on you: Distributed Multi-Dimensional IoT microservice anomaly detection. In 2018 14th International Conference on Network and Service Management (CNSM) (pp. 72-80). IEEE. (Year: 2018).*

Liu, Y., Garg, S., Nie, J., Zhang, Y., Xiong, Z., Kang, J. and Hossain, M.S., 2020. Deep anomaly detection for time-series data in industrial IoT: A communication-efficient on-device federated learning approach. IEEE Internet of Things Journal, 8(8), pp. 6348-6358. (Year: 2020).*

Blackstock et al., IoT Interoperability: A Hub-based Approach, 2014, IEEE International Conference on the Internet of Things (IOT), pp. 80-84.

Miloslavskaya et al., Ensuring Information Security for Internet of Things, 2017, IEEE 5th International Conference of Future Internet of Things and Cloud, pp. 62-69.

International Application No. PCT/US2019/056389, Search Report and Written Opinion dated Jan. 16, 2020.

Li et al., A Distributed Consensus Algorithm for Decision Making in Service-Oriented Internet of Things, Old Dominion University, ODU Digital Commons, 2014.

Nguyen et al., A Software-Defined Model for IoT Clusters: Enabling Applications on Demand, Faculty of Engineering and IT, University of Technology Sydney, Australia, IEEE Xplore, Apr. 23, 2018.

Fredj et al., A Scalable IoT Service Search Based on Clustering and Aggregation, 2013 IEEE International Conference on Green Computing and Communication and IEEE Internet of Things and IEEE Cyber, Physical and Social Computing, pp. 1-8.

International Application No. PCT/US2016/025661, International Search Report and Written Opinion mailed Jul. 7, 2016.

Liu et al., A Lightweight Anomaly Mining Algorithm in the Internet of Things, 2014 IEEE 5th International Conference on Software Engineering and Service Science, 2014, pp. 1142-1145.

Sivanathan et al., Classifying IoT Devices in Smart Environments Using Network Traffic Characteristics, IEEE, TMC, No. 8, pp. 1745-1759, Aug. 2018.

Sivanathan et al., Detecting Behavioral Change of IoT Devices Using Clustering-Based Network Traffic Modeling, IEEE LCN 2019, Mar. 30, 2020.

Sivanathan et al., Inferring IoT Device Types from Network Behavior Using Unsupervised Clustering, IEEE ICN 2019, Oct. 2019.

Al-Shaer et al., Design and Implementation of Firewall Policy Advisor Tools, 2002.

(56) References Cited

OTHER PUBLICATIONS

Al-Shaer et al., Firewall Policy Advisor for Anomaly Discovery and Rule Editing, Integrated Network Management VIII, 2003.
Martin et al., Requirements and Recommendations for CWE Compatibility and CWE Effectiveness, Version 1.0, Jul. 28, 2011.
National Electrical Manufacturers Association, Manufacturer Disclosure Statement for Medical Device Security, HIMSS/NEMA Standard HN Jan. 2013, 2013.
Charyyev et al., Locality-Sensitive IoT Network Traffic Fingerprinting for Device Identification, IEEE Internet of Things Journal, 2020, vol. 8, No. 3, pp. 1272-1281.
Du et al., A Lightweight Flow Feature-Based IoT Device Identification Scheme, Security and Communication Networks, 2022.
Zhao et al., A Few-Shot Learning Based Approach to IoT Traffic Classification, IEEE Communications Letters, 2021.
Author Unknown, Cisco Encrypted Traffic Analytics, Feb. 10, 2021.
Arash Fasihi, Rule Based Inference and Action Selection Based on Monitoring Data in IoT, Dec. 1, 2015.
Cramer et al., Detecting Anomalies in Device Event Data in the IoT, Proceedings of the 3td International Conference on Internet of Things, Big Data and Security, Mar. 21, 2018, pp. 52-62.
Midi et al., Kalis—A System for Knowledge-driven Adaptable Intrusion Detection for the Internet of Things, 2017 IEEE 37th International Conference on Distributed Computing Systems, pp. 656-666.
Charu C. Aggarwal, Outlier Analysis, Retrieved from the Internet, URL: https://web.archive.org/web/20130210212057/http://charuaggarwal.net/outlierbook.pdf.
Hirofumi Nakakoji, et al., "Study of the Incident Tendency Detection Method on Frequency Analysis," Technical Report of IEICE, Japan, The Institute of Electronics, Information and Communication Engineers (IEICE), Jul. 14, 2005, vol. 105, No. 193, pp. 83-88.
Chen et al., A Model-Based Validated Autonomic Approach to Self-Protect Computing Systems, IEEE Internet of Things Journal, Oct. 2014, pp. 446-460, vol. 1, No. 5.
Meidan et al., ProfilloT: A Machine Learning Approach for IoT Device Identification Based on Network Traffic Analysis, In Proceedings of the Symposium on Applied Computing (SAC'17), Apr. 3-7, 2017, pp. 506-509.

* cited by examiner

MULTI-DIMENSIONAL PERIODICITY DETECTION OF IOT DEVICE BEHAVIOR

CROSS-REFERENCE TO RELATED APPLICATIONS

The present application claims priority to U.S. Provisional Patent Application Ser. No. 62/745,757 filed Oct. 15, 2018, which is hereby incorporated by reference herein.

DETAILED DESCRIPTION

Figure 1:
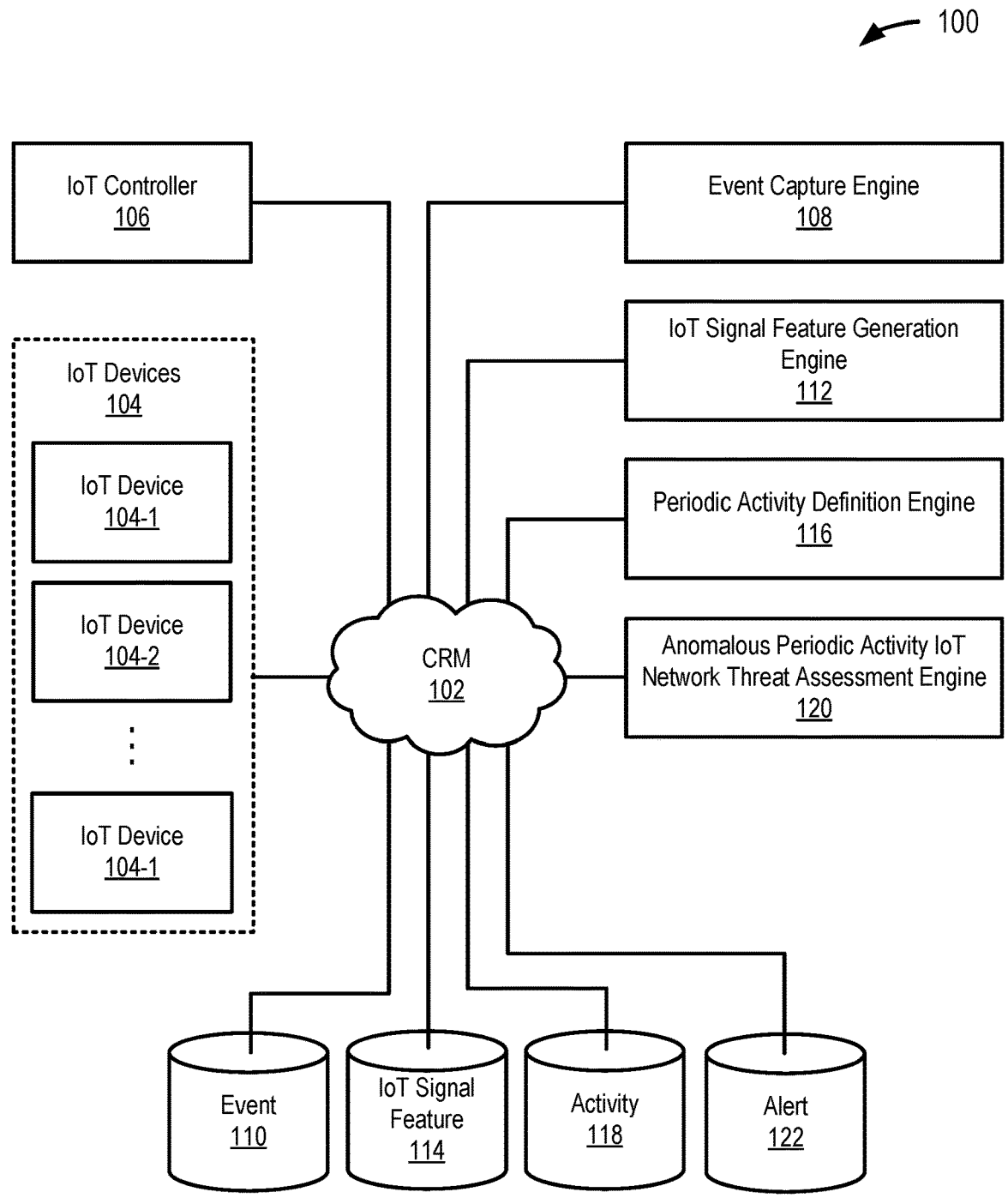
FIG. 1 depicts a diagram of an example of an Internet of Things (IoT) network security system.

FIG. 1 depicts a diagram 100 of an example of an Internet of Things (IoT) network security system. The diagram 100 includes a computer-readable medium (CRM) 102, IoT device 104-1 . . . 104-$n$ (collectively, "IoT devices 104") coupled to the CRM 102, an IoT controller engine 106 coupled to the CRM 102, an event capture engine 108 coupled to the CRM 102, an event datastore 110 coupled to the CRM 102, an IoT signal feature generation engine 112 coupled to the CRM 102, an IoT signal feature datastore 114 coupled to the CRM 102, a periodic activity generation engine 116 coupled to the CRM 102, an activity datastore 118 coupled to the CRM 102, an anomalous periodic activity IoT network threat assessment engine 120 coupled to the CRM 102, and an alert datastore 122 coupled to the CRM 102.

The CRM 102 and other computer readable mediums discussed in this paper are intended to represent a variety of potentially applicable technologies. For example, the CRM 102 can be used to form a network or part of a network. Where two components are co-located on a device, the CRM 102 can include a bus or other data conduit or plane. Where a first component is located on one device and a second component is located on a different device, the CRM 102 can include a wireless or wired back-end network or LAN. The CRM 102 can also encompass a relevant portion of a WAN or other network, if applicable.

The computer readable mediums discussed in this paper are intended to include all mediums that are statutory (e.g., in the United States, under 35 U.S.C. 101), and to specifically exclude all mediums that are non-statutory in nature to the extent the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The devices, systems, and computer-readable mediums described in this paper can be implemented as a computer system or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. Depending upon implementation-specific or other considerations, the I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

A computer system can be implemented as an engine, as part of an engine or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

Returning to the example of FIG. 1, the IoT devices 104 are intended to represent purposefully built or configured IoT devices. Examples of IoT devices include thermostats, mobile devices, biological managers, sensory devices, and functionality performing devices. In being purposely built IoT devices, the IoT devices 104 are built to have specific operational parameters. For example, a thermometer may be built to provide signals from a temperature sensor. In being purposely configured IoT devices, the IoT devices 104 can be configured to operate according to specific operational parameters in accordance with input from a human or artificial agent. For example, an IoT device of the IoT devices 104 can be a thermostat configured to control an air conditioner to cool a room to a configurable temperature at a configurable time. Other examples include infusion pumps, imaging devices (e.g., a CT-scanner, an X-ray machine, a picture archiving and communication system (PACS), and a digital imaging and communications in medicine (DICOM®) workstation). As another example, an agent can specify an IoT device should not communicate with a specific data source and should only be used to view DICOM pictures, and the IoT device can be configured to refrain from communicating with the specific data source or perform an action other than viewing DICOM pictures as part of purposeful configuration. For a purposely configured device to be considered an IoT device, it should operate within IoT operational parameters; deviation from the IoT operational parameters can cause risk to be elevated and/or to trigger alerts, such as "browser usage" if the deviation can be ascertained.

In a specific implementation, the IoT devices 104 include wired or wireless interfaces through which the IoT devices 104 can send and receive data over wired and wireless connections. As used in this paper, the term "implementation" means an implementation that serves to illustrate by way of example and not necessarily by limitation. The IoT devices 104 can have unique identifiers that can be used in the transmission of data through a network. Unique identifiers of the IoT devices 104 can include identifiers created in accordance with Internet Protocol version 4 (hereinafter referred to as "IPv4"), or identifiers created in accordance with Internet Protocol version 6 (hereinafter referred to as "IPv6"), of which both protocol versions are hereby incorporated by reference. Depending upon implementation-specific or other considerations, the IoT devices 104 can include applicable communication interfaces for receiving and sending data according to an applicable wireless device protocol. Examples of applicable wireless device protocols include Wi-Fi, ZigBee®, Bluetooth®, and other applicable low-power communication standards.

In a specific implementation, the IoT devices 104 act as stations. A station, as used in this paper, can be referred to as a device with a media access control (MAC) address and a physical layer (PHY) interface to a wireless medium that complies with the IEEE 802.11 standard. Thus, for example, the network devices can be referred to as stations, if applicable. IEEE 802.11a-1999, IEEE 802.11b-1999, IEEE 802.11g-2003, IEEE 802.11-2007, and IEEE 802.11n TGn Draft 8.0 (2009) are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative embodiments, a station may comply with a different standard than Wi-Fi or IEEE 802.11, may be referred to as something other than a "station," and may have different interfaces to a wireless or other medium.

In a specific implementation, the IoT devices 104 are configured to access network services in compliance with IEEE 802.3. IEEE 802.3 is a working group and a collection of IEEE standards produced by the working group defining the physical layer and data link layer's MAC of wired Ethernet. This is generally a local area network technology with some wide area network applications. Physical connections are typically made between nodes and/or infrastructure devices (hubs, switches, routers) by various types of copper or fiber cable. IEEE 802.3 is a technology that supports the IEEE 802.1 network architecture. As is well-known in the relevant art, IEEE 802.11 is a working group and collection of standards for implementing wireless local area network (WLAN) computer communication in the 2.4, 3.6 and 5 GHz frequency bands. The base version of the standard IEEE 802.11-2007 has had subsequent amendments. These standards provide the basis for wireless network products using the Wi-Fi brand. IEEE 802.1 and 802.3 are incorporated by reference.

In a specific implementation, the IoT devices 104 have respective personalities. As used in this paper, a personality is a collection of behaviors; behavior is used to describe a specific type of device. As used in this paper, a behavior is an application-driven collection of one or more related activities. A personality can be bad, which means the personality is identifiable as one that belongs to a device that exhibits or has an unacceptable risk to later exhibit undesirable behavior. A personality can be good, which means the personality is identifiable as one that belongs to a device that has not and is not expected to later exhibit undesirable behavior. Devices can exhibit anomalous behavior, and anomaly detection is a useful tool to determine whether a device is exhibiting undesirable behavior, so anomalous behavior is sometimes associated with undesirable behavior.

However, over time, anomalous behavior can be indicative of an as-of-yet-unidentified, but potentially good personality. If a device with a first personality exhibits anomalous behavior, it may be possible to define a second personality similar in some ways to the first personality, but for which certain behavior is not anomalous. Similarly, a first personality could be better defined over time to include what was previously anomalous behavior as non-anomalous behavior. Accordingly, it may be desirable to provide a system that can not only classify IoT devices as having various personalities, but also to provide a system that can allow personality to have malleable definitions and that can define new personalities over time.

The IoT controller engine 106 is intended to represent a system that provides a service to one or more of the IoT devices 104. In a specific implementation, a "server part" of an application runs on (or through) the IoT controller engine 106, which can be implemented as a virtual machine and/or a cluster of application servers, and a "client part" runs on one or more of the IoT devices 104. The "server part" and the "client part" can be referred to collectively as an IoT application, and the IoT controller engine can be referred to as an IoT application controller engine. (It may be noted that the "client part" is sometimes conflated with the front end of a server, in which case the "client part" could be characterized as the front end of a server and the "server part" as the back end of the server; context will dictate.) In a specific implementation, the IoT controller engine 106 is located "on-prem," an example of which is provided by way of example in FIG. 2.

The event capture engine 108 is intended to represent an engine capable of detecting events that occur on the CRM 102. The location of a sensor can determine event capture functionality. For example, a network event can be detected by listening for wireless packets sent between the IoT devices 104 and the IoT controller 106 or by listening to communications between a load balancer and a front end application engine (see, e.g., FIG. 3). Other examples include listening in on a message bus, capturing syslog messages, or the like. In an on-prem implementation, the event capture engine 108 can be implemented with a mirror to enable, e.g., packet sniffing, but in the cloud, the event capture engine 108 may use a message "bus," packet forwarder (e.g., a script on a load balancer to forward packets), or log-based analysis. In a specific implementation, the event capture engine 108 is lightweight, which is desirable to give the ability to correlate events captured by multiple different inspectors at multiple different locations. Newly captured events may be characterized as "raw" events and this characterization can persist until the event is normalized or otherwise abstracted in some way. Raw events may or may not be maintained in a datastore post-abstraction, depending upon whether it is desirable to facilitate audits, historical analysis, or otherwise make use of the raw event data.

Understanding the structure of IoT application data, and the payload an application carries in a network transmission, is an element in modeling the behavior of an IoT device. Existing IoT security solutions focus on modeling with network meta-data, but are not as effective when used for situations where more data protection is required, such as data leak prevention (DLP). The event capture engine 108 addresses these deficiencies by capturing network payload in clear text (e.g., for an on-prem implementation) or in a format suitable for a desired deployment model (with normalization of disparate event formats, if applicable).

Figure 2:
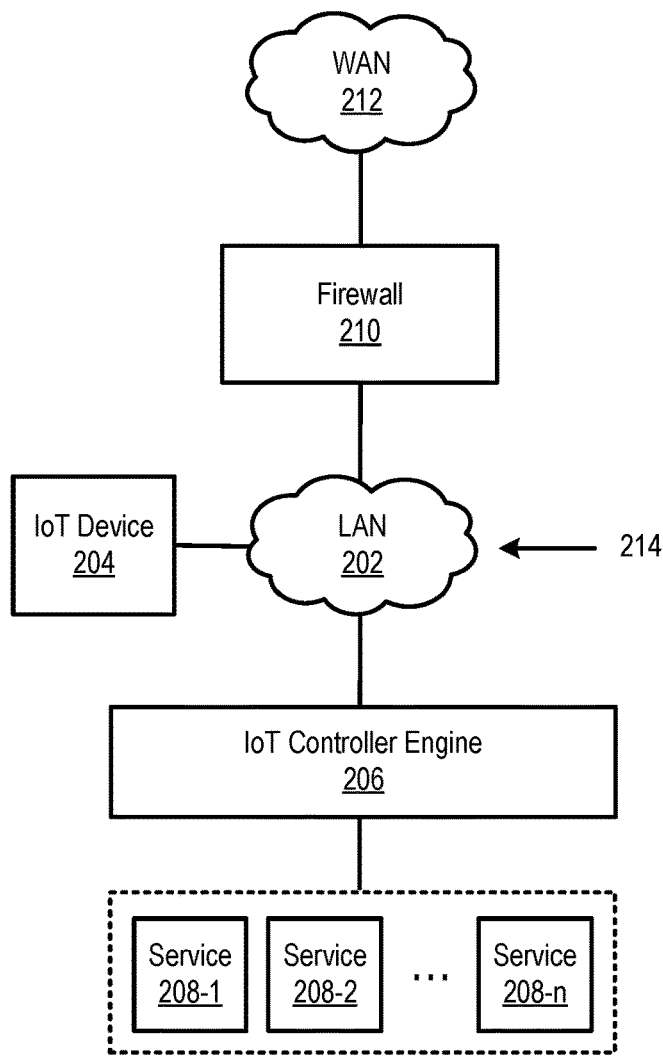
FIG. 2 depicts a diagram of an example of an on-prem IoT controller.

FIG. 2 depicts a diagram 200 of an example of an on-prem IoT controller. The diagram 200 includes a LAN 202, an IoT device 204 coupled to the LAN 202, an IoT controller engine 206 coupled to the LAN 202, a service 208-1 to a service 208-n (the services 208) coupled to the IoT controller engine 206, a firewall 210 coupled to the LAN 202, and a WAN 212 coupled to the firewall 210. It may be noted that the IoT device 204, IoT controller engine 206, the services 208, and the firewall 210 can also be referred to as "on" the LAN 202 or "on-prem."

The LAN 202 is intended to represent a relatively local network of IoT devices, IoT controller engines, and potentially other devices. It should be noted that enterprise networks can include geographically distributed LANs coupled across WAN segments. In a distributed enterprise network, gateways may be local at each LAN (each LAN is sometimes referred to as a Basic Service Set (BSS) in IEEE 802.11 parlance, though no explicit requirement is suggested here) or localized using, e.g., VLAN tunneling (the connected LANs are sometimes referred to as an Extended Service Set (ESS) in IEEE 802.11 parlance, though no explicit requirement is suggested here), though some form of gateway functionality is generally still needed to connect the various LANs in a geographically distributed enterprise network.

The IoT device 204 can be implemented in a manner similar to that described for the IoT devices 104 with reference to FIG. 1. The IoT controller engine 206 can be implemented in a manner similar to that described for the IoT controller 106 with reference to FIG. 1. The services 208 are intended to represent on-prem services provided through the IoT controller engine 206 to the IoT device 204. The firewall 210 is intended to represent an example of a device located between on-prem devices (such as the IoT device 204 and the IoT controller engine 206) of the LAN 202 and off-prem devices of the WAN 212 (which generally includes other networks, including LANs, not shown).

In a specific implementation, an inspector is coupled to the LAN 202 at the location identified by the arrow 214 (i.e., the inspector is "on" the LAN 202 and may be referred to as an on-prem inspector). In such an implementation, it would not be unusual for network traffic to be transmitted between the IoT device 204 and the IoT controller engine 206 in clear text. For example, the inspector can be implemented as a sniffer that is capable of detecting network traffic between the IoT device 204 and the IoT controller engine 206.

Figure 3:
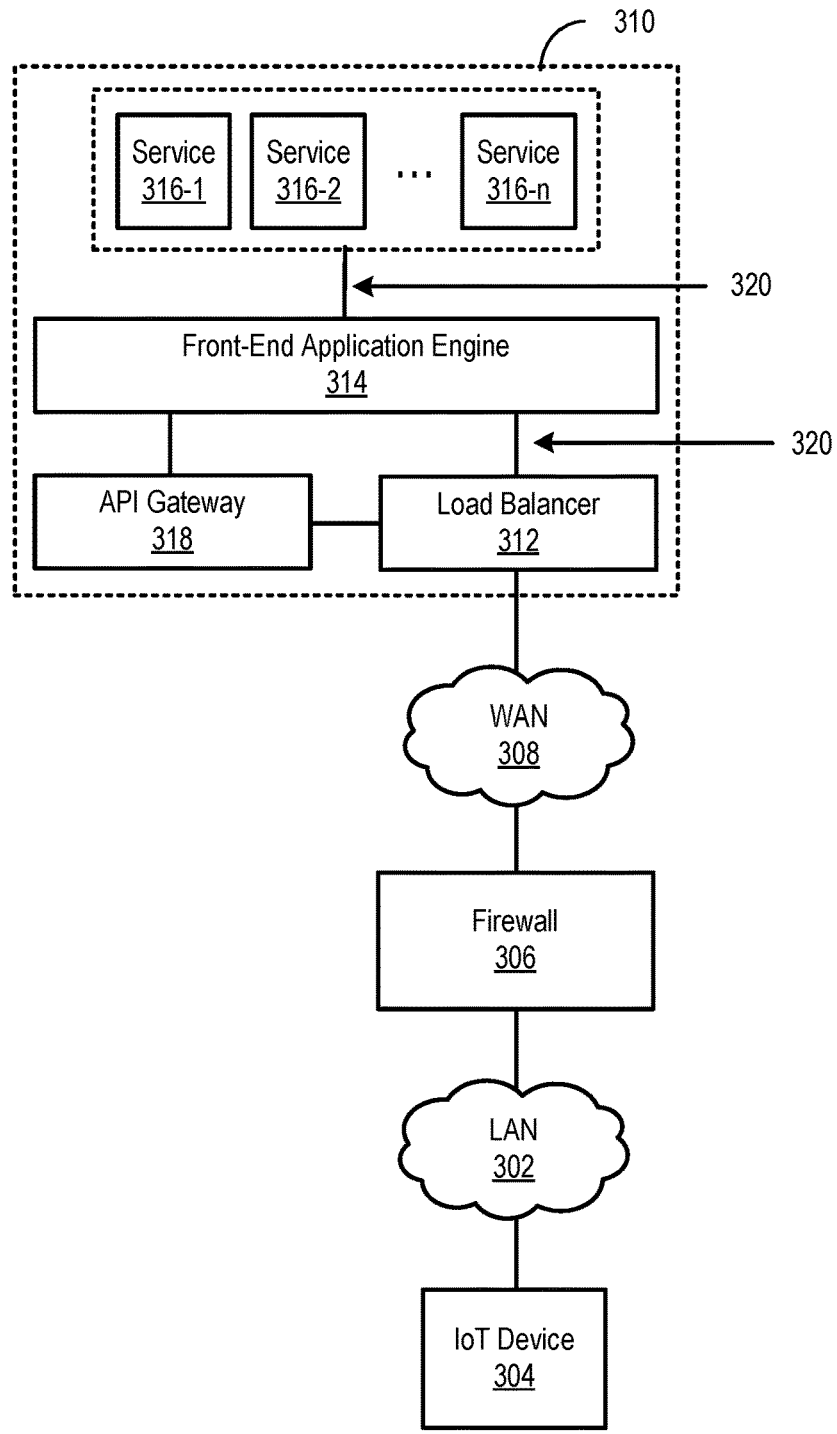
FIG. 3 depicts a diagram of an example of an off-prem IoT application controller.

Referring once again to the example of FIG. 1, in a specific implementation, the IoT controller engine 106 and the event capture engine 108 are located "off-prem," an example of which is provided by way of example in FIG. 3. In addition, the event capture engine 108 may have an on-prem component that, e.g., monitors transmissions to or from IoT devices.

FIG. 3 depicts a diagram 300 of an example of an off-prem IoT application controller. The diagram 300 includes a LAN 302, an IoT device 304 coupled to the LAN 302, a firewall 306 coupled to the LAN 302, a WAN 308 coupled to the firewall 306, and an IoT application controller 310 coupled to the WAN 308. It may be noted that the IoT device 304 and the firewall 306 can also be referred to as "on" the LAN 302 or "on-prem," while the IoT application controller engine 310 can also be referred to as "on" the WAN 308 (and not on the LAN 302) or "off-prem." In a specific implementation, the IoT application controller 310 is implemented in the cloud.

The LAN 302 is intended to represent a relatively local network of IoT devices and potentially other devices. The IoT device 304 can be implemented in a manner similar to that described for the IoT devices 104 with reference to FIG. 1. The firewall 306 is intended to represent an example of a device located between on-prem devices (such as the IoT device 304) of the LAN 302 and off-prem devices (such as the IoT application controller engine 310) on the WAN 308. A link between the WAN 308 and the IoT application controller engine 310 can be accomplished via, e.g., a virtual private network (VPN) engine (not shown) with a clear text protocol (a RESTful interface would be less likely, but not necessarily inapplicable).

The IoT application controller engine 310 can be implemented in a manner similar to that described for the IoT controller 106 with reference to FIG. 1. In the diagram 300, the IoT application controller engine 306 includes a load balancer 312, a front-end application engine 314 coupled to the load balancer 312, a service 316-1 to a service 316-n (collectively, the services 316) coupled to the front-end application engine 314, and an API gateway 318 coupled to the load balancer 312 and the front-end application engine 314.

The load balancer 312 is intended to represent a server-side engine through which external clients can be coupled to services. In a specific implementation, the load balancer 312 listens on a port to which external clients connect to access services. The load balancer forwards requests to backend servers associated with the services. Advantageously, the load balancer 312 prevents the IoT device 304 from contacting backend servers directly. The load balancer 312 can be implemented so as to avoid making it a single point of failure, such as by implementing it as a high-availability pair of engines that can replicate session persistence data if desirable for a given application.

The front-end application engine 314 is intended to represent an interface between the load balancer 312 (client side) and the services 316 (server side). The services 316 can be referred to as off-prem services or, in a specific implementation, off-prem application services.

In a specific implementation, the services 316 represent a portion of a microservices architecture in which services are fine-grained and protocols are lightweight. Microservices-based architectures enable continuous delivery and deployment and frequently include processes that communicate over a network to fulfill a goal using technology-agnostic protocols such as HTTP (but may include other kinds of inter-process communication mechanisms such as shared memory); independently deployable services; easily replaceable services; services organized around capabilities (e.g., user interface front-end, recommendation, logistics, billing, etc.); services implemented using different programming languages, databases, hardware, and software environment, depending on what fits best; and/or relatively small services that are messaging enabled, bounded by contexts, autonomously developed, independently deployable, decentralized, and built and released with automated processes. Generally, a microservices-based architecture naturally enforces a distributed structure; lends itself to a continuous delivery software development process; adheres to principles such as fine-grained interfaces, business-driven deployment, cloud application architectures, polyglot programming and persistence, lightweight container development, decentralized continuous delivery, and DevOps with holistic service monitoring; and/or provides characteristics that are beneficial to scalability.

The API gateway 318 is intended to represent an interface between the load balancer 312 and the services 316, but it acts as an API front-end, receiving API requests. In a specific implementation, the API gateway 318 enforces throttling and security policies, passes requests to the (back-end) services 316, and passes responses to the IoT device 304. The API gateway 318 may or may not also include a transformation engine to orchestrate and modify requests and responses on the fly, collect analytics data, provide caching, and support authentication, authorization, security, audit, and regulatory compliance.

In a specific implementation, an event capture engine (which may be referred to as an off-prem event capture engine or an off-prem component of an event capture engine) is operationally connected to the IoT application controller engine 310 at the locations identified by the arrows 320. In such an implementation, an inspector is located "behind" the load balancer 312 (and may be referred to as an application load balancer inspector) and inspectors are located between the front-end application engine 314 and each of the services 316 (e.g., there is an inspector in front of each of the services 316, which may be referred to as application service inspectors). Behind is intended to mean the load balancer 312 is between the inspector and the IoT device 304.

Figure 4:
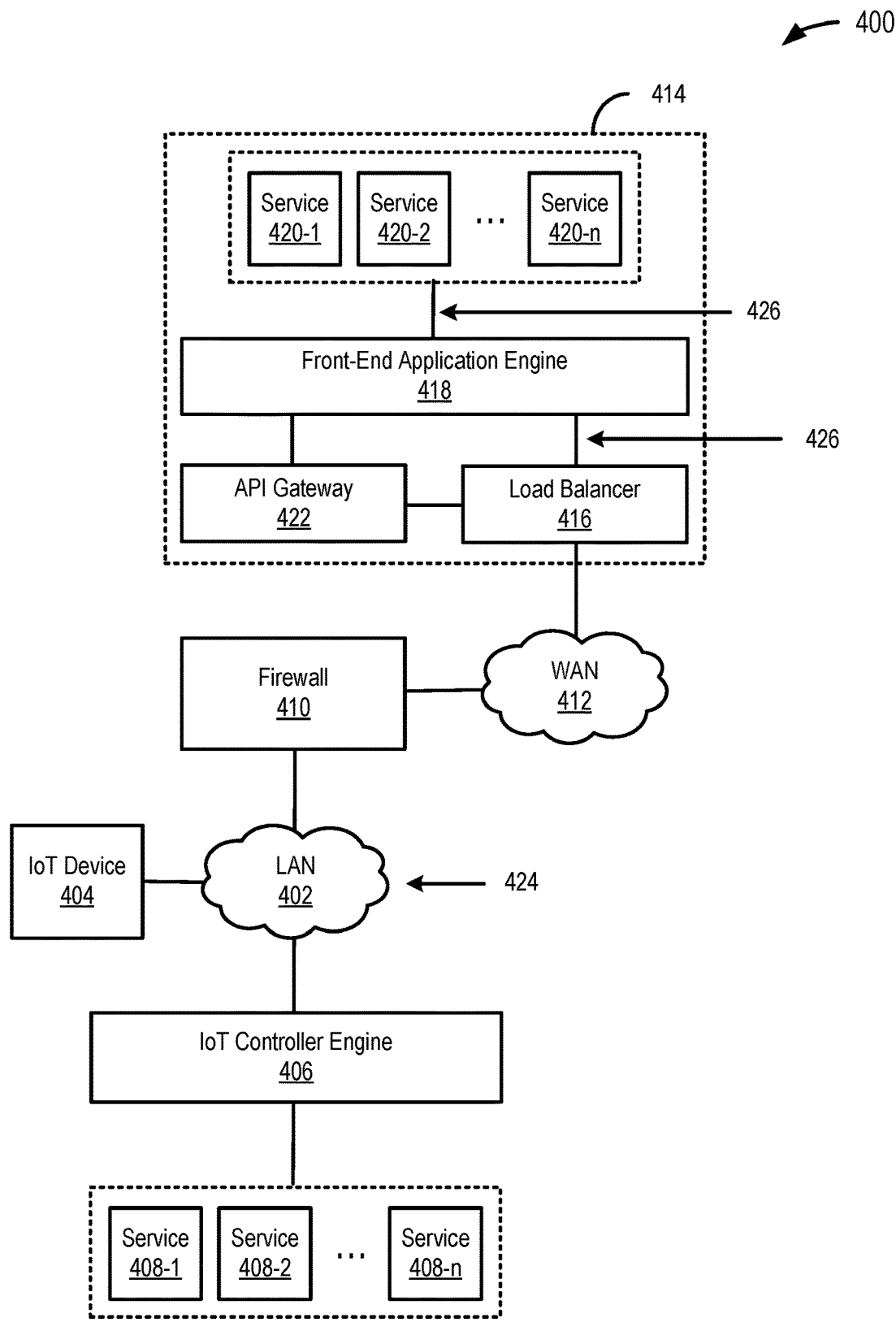
FIG. 4 depicts a diagram of an example of a hybrid IoT controller utilizing a service-oriented architecture (SOA).

Referring once again to the example of FIG. 1, in a specific implementation, the IoT controller engine 106 and the event capture engine 108 have both "on-prem" and "off-prem" components, an example of which is provided by way of example in FIG. 4.

FIG. 4 depicts a diagram 400 of an example of a hybrid IoT controller utilizing a service-oriented architecture (SOA). As used in this paper, a SOA logically represents a business activity with a specified outcome, is self-contained, is a black-box for service requesters, and may consist of other underlying services. The diagram 400 includes a LAN 402, an IoT device 404 coupled to the LAN 402, an IoT controller engine 406 coupled to the LAN 402, a service 408-1 to a service 408-n (collectively, the services 408) coupled to the IoT controller engine 406, a firewall 410 coupled to the LAN 402, a WAN 412 coupled to the firewall 410, and an IoT application controller 414 coupled to the WAN 412. It may be noted that the IoT device 404, the IoT controller engine 406, and the firewall 410 can also be referred to as "on" the LAN 402 or "on-prem," while the IoT application controller engine 414 can also be referred to as "on" the WAN 410 (and not on the LAN 402) or "off-prem." The services 408 can also be referred to as on-prem services.

The LAN 402 is intended to represent a relatively local network of IoT devices and potentially other devices. The IoT device 404 can be implemented in a manner similar to that described for the IoT devices 104 with reference to FIG. 1. The IoT controller engine 406 can be implemented in a manner similar to that described for the IoT controller 106 with reference to FIG. 1 or the IoT controller 206 with reference to FIG. 2. The firewall 410 is intended to represent an example of a device located between on-prem devices (such as the IoT device 404 or IoT controller engine 406) of the LAN 402 and off-prem devices (such as the IoT application controller engine 414) of the WAN 412.

The IoT application controller engine 414 can be implemented in a manner similar to that described for the IoT controller engine 106 with reference to FIG. 1 or the IoT application controller 310 with reference to FIG. 3. In the diagram 400, the IoT application controller engine 414 includes a load balancer 416, a front-end application engine 418 coupled to the load balancer 416, a service 420-1 to a service 420-n (collectively, the services 420) coupled to the front-end application engine 418, and an API gateway 422 coupled to the load balancer 416 and the front-end application engine 418.

The front-end application engine 418 is intended to represent a front-end interface to the services 420. (The front-end application engine 418 and the services 420 can be collectively referred to as an application server.) In a specific implementation, the front-end application engine 418 can include a web server based on, e.g., simple object access protocol (SOAP). Alternative implementations include messaging server, representational state transfer (RESTful) HTTP server, OPC unified architecture (OPC-UA), Windows communication foundation (WCF), Apache Thrift, and SORCER.

In a specific implementation, an event capture engine is coupled to the LAN 402 at the location identified by the arrow 424 (i.e., an inspector is "on" the LAN 402 and may be referred to as an on-prem inspector). In such an implementation, it would not be unusual for network traffic to be transmitted between the IoT device 404 and the IoT controller engine 406 in clear text. For example, the inspector can be implemented as a sniffer that is capable of detecting network traffic between the IoT device 404 and the IoT controller engine 406.

In a specific implementation, an event capture engine is operationally connected to the IoT application controller engine 414 at the locations identified by the arrows 426. In such an implementation, an inspector is located "behind" the load balancer 416 (and may be referred to as an application load balancer inspector) and inspectors are located between the front-end application engine 418 and each of the services 420 (e.g., there is an inspector in front of each of the services 420, which may be referred to as application service inspectors). Behind is intended to mean the load balancer 416 is between the inspector and the IoT device 404.

Referring once again to the example of FIG. 1, the event capture engine 108 is intended to include a set of inspectors located at various locations throughout a network, as is described with reference to FIGS. 2-4. Depending upon implementation-specific, configuration-specific, or other factors, it may be desirable for the event capture engine 108, or at least inspectors thereof, to be lightweight, making it easier to deploy as many inspectors as may be advantageous without difficulty and to correlate events associated with an activity across multiple inspectors. In a specific implementation, the associated event generation components are co-located with their respective inspectors, which can include an on-prem inspector, an application load balancer inspector, and/or application service inspectors.

The event datastore 110 is intended to represent a datastore of events at any stage of transformation, from raw events to normalized, aggregated, enhanced, and/or otherwise transformed events. A smallest unit of identification for an IoT device could be characterized as an event. An event data structure may or may not include a representation of an event that is not a network event, such as a local database access event, an event obtained from log message(s) via an active query, or the like. Because a network session of an IoT device of the IoT devices 104 is a network event (or a persistent network session can be "chunked" into a series of network events), the IoT device can be identified as a participant in an activity defined by events at least partially matching relevant event data structures in the event datastore 110 that represent network events of the IoT device. As used in this paper, an activity data structure is a labeled collection of events. IoT application behavior is sufficiently different from IoT device behavior that the smallest meaningful unit of identification for an IoT application is an activity (e.g., a file download). In an example of operation, the event capture engine 108 stores captured events in the event datastore 110, which may initially be referred to as "raw events."

The IoT signal feature generation engine 112 is intended to represent an engine that transforms raw events in the event datastore 110 into IoT signal features. In a specific implementation, the IoT signal feature generation engine 112 is co-located with the event capture engine 108 for convenience. For example, it is convenient to normalize events upon capture, to perform at least some aggregation on the normalized events, and to extract at least some signal features from the normalized (and potentially aggregated) events. Alternatively or in addition, aggregation and feature extraction is done via a component of the IoT signal feature generation engine 112 that is remote relative to the event capture engine 108.

Figure 5:
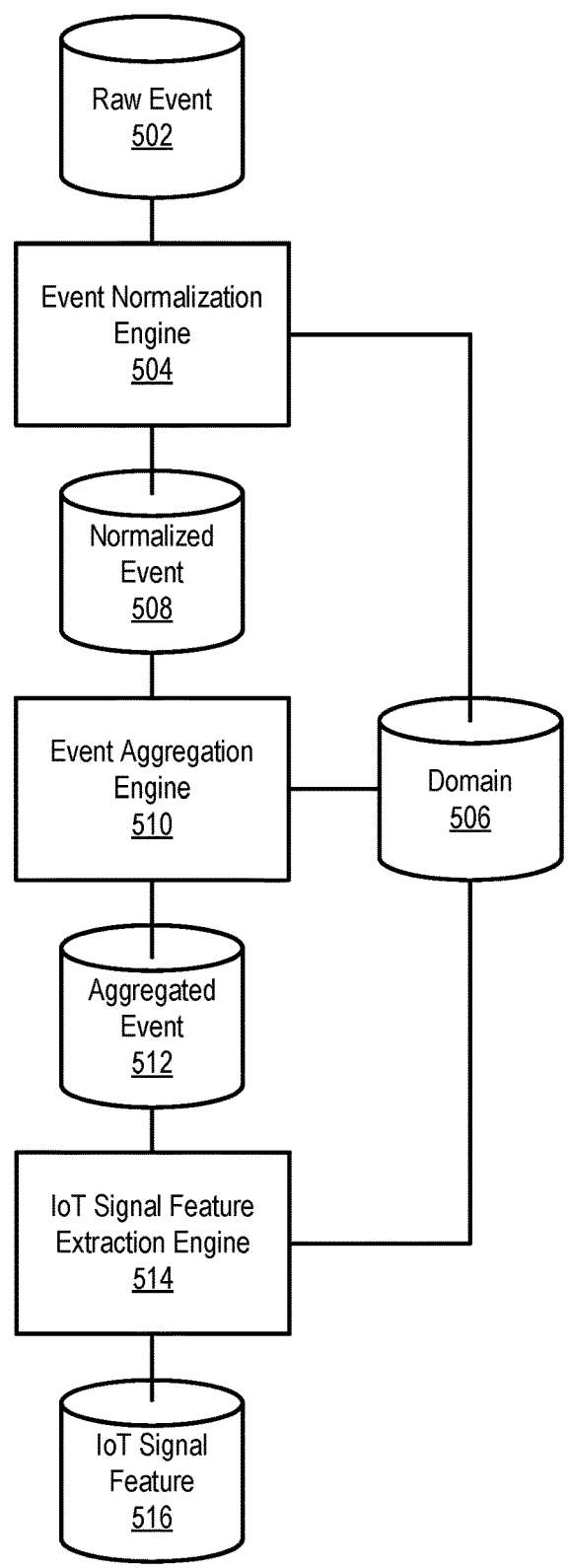
FIG. 5 depicts a diagram of an example of an IoT signal feature generation engine.

FIG. 5 depicts a diagram 500 of an example of an IoT signal feature generation engine. The diagram 500 includes a raw event datastore 502, an event normalization engine 504 coupled to the raw event datastore 502, a domain datastore 506 coupled to the event normalization engine 504, a normalized event datastore 508 coupled to the event normalization engine 504, an event aggregation engine 510 coupled to the domain datastore 506 and the normalized event datastore 508, an aggregated event datastore 512 coupled to the event aggregation engine 510, an IoT signal feature extraction engine 514 coupled to the domain datastore 506 and the aggregated event datastore 512, and an IoT signal feature datastore 516 coupled to the IoT signal feature extraction engine 514. Some of the components illustrated in the diagram 500 can be implemented in whole or in part at a different physical location than other components.

The raw event datastore 502 is intended to represent events of various kinds. A significant subclass of events are network session events or "network events." In some implementations, network events can appropriately be referred to as "packet-based" (or "frame-based") events because network event capture is of packets or frames. In a specific implementation, a discrete network event is a network session. Alternatively or in addition, a discrete network event is a portion of a persistent network session that has been broken into chunks, wherein the chunks of a network session, in the aggregate, comprise a network session. Another potential subclass of events includes message transport events, such as messages using a lightweight publish/subscribe messaging transport (e.g., message queuing telemetry transport (MQTT)). Another potential subclass of events includes message log events, such as messages using a standard to separate message generators, systems that store messages, and message analysis and reporting engines (e.g., syslog). The raw event datastore 502 can be considered part of a "super" datastore (such as the event datastore 110 of FIG. 1) that incorporates other datastores, such as the normalized event datastore 508, the aggregated event datastore 512, and the IoT signal feature datastore 516.

The event normalization engine 504 is intended to represent an engine that normalizes events of disparate formats. The event normalization engine 504 uses information from the domain datastore 506 to determine a normalized (e.g., standardized) format for events and normalizes (e.g., transforms) events from the raw event datastore 502 for storage into the normalized event datastore 508. In a specific implementation, events are normalized using one or more of a timestamp, tagging (e.g., from the domain datastore 506), an ID (e.g., a user ID or event ID), or the like. Normalizing events enables later engines to perform an apples-to-apples comparison of events for, e.g., aggregation purposes. In an implementation in which, e.g., only network events are aggregated, normalization may or may not be considered optional.

The event aggregation engine 510 is intended to represent an engine for aggregating a normalized event from the normalized event datastore 508 with other related events. In a specific implementation, the other related events are also normalized events in the normalized event datastore 508. Related events can include, for example, multiple discrete network events of a persistent session; events associated with the same source, user, time, or application; events that (based on, e.g., domain knowledge) might be related to an activity (e.g., login, download, streaming, or other possible activity); events associated with an IoT device profile; events that are related on a time series level; or the like. The event aggregation engine 510 stores the aggregated events in the aggregated event datastore 512. Note that an "aggregated event" can include one or more normalized events and context will dictate whether that means one aggregated event includes one normalized event or one aggregated event includes multiple normalized events.

The IoT signal feature extraction engine 514 is intended to represent an engine for extracting features from signals associated with an IoT device. In a specific implementation, a signal is treated as a minimal, or atomic, event for the purpose of determining periodicity, though a given signal can have multiple associated features. For example, a five minute transformation can be treated as having five signal features associated with each of the five minutes. A feature value includes a data sample corresponding to the feature itself. The IoT signal feature extraction engine 514 stores the feature values in the IoT signal feature datastore 516.

In an example of operation, events are assumed to be network session events. The event normalization engine 504 (if applicable) normalizes a volume (e.g., a number of bytes) of events over a time span (e.g., a five minute interval). The event aggregation engine 510 aggregates the one or more events captured during the time span. It may be noted, an event that is not aggregated may still be analyzed by the IoT signal feature extraction engine 514, along with any aggregated events. The extracted signal features, which can be characterized as aggregated, normalized, enriched, or otherwise transformed events, are used to identify periodic activities as described with reference to FIG. 6.

Figure 6:
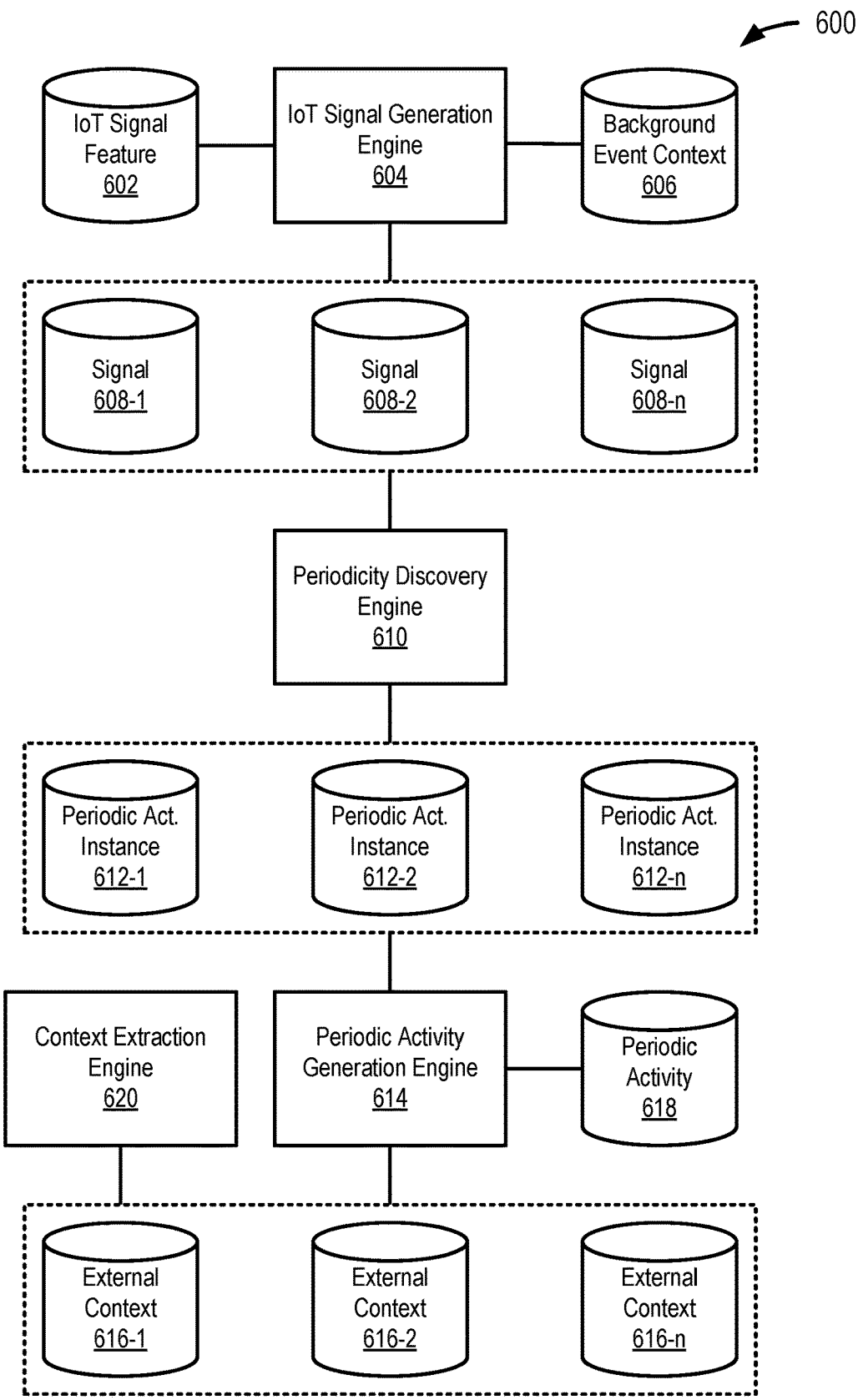
FIG. 6 depicts a diagram of an example of a periodic activity definition engine.

FIG. 6 depicts a diagram 600 of an example of a periodic activity definition engine. The diagram 600 includes an IoT signal feature datastore 602, an IoT signal generation engine 604 coupled to the IoT signal feature datastore 602, a background event context datastore 606 coupled to the IoT signal generation engine 604, a signal datastore 608-1 to a signal datastore 608-n (collectively, the signal datastores 608) coupled to the IoT signal generation engine 604, a periodicity discovery engine 610 coupled to the signal datastores 608, a periodic activity instance datastore 612-1 to a periodic activity instance datastore 612-n (collectively, the periodic activity instance datastores 612) coupled to the periodicity discovery engine 610, a periodic activity generation engine 614 coupled to the periodic activity instance datastores 612, an external context datastore 616-1 to an external context datastore 616-n (collectively, the external context datastores 616) coupled to the periodic activity generation engine 614, a periodic activity datastore 618 coupled to the periodic activity generation engine 614, and a context extraction engine 620 coupled to the external context datastores 616.

The signal features datastore 602 is intended to represent a datastore of event data structures comprising a start time value, an end time value, an interval value, and an interval fluctuation (referred to herein as a time delta) value. (It may be noted, at this stage the values may or may not be understood as relevant.) Normalization can facilitate creation of periodicity descriptors for different types of events (e.g., network, message queue, syslog, etc.). In a specific implementation, the start time is a timestamp attributed to a start of a periodic activity (which can be the same as the start of a first detected event of the activity), the end time is a timestamp attributed to an end to the periodic activity (the value can be considered blank or null until such time as the activity ceases), the interval is a time span between two periodic events (or two aggregated events), and the time delta is an acceptable deviation from the interval. What is meant by "acceptable deviation" is that an attribution of periodicity is applicable even if the interval between detected events varies somewhat, though by how much will depend upon the sophistication of the system (in general, the greater the time delta for the interval between periodic events, the harder it is to identify the periodicity). The signal features for a given (potentially periodic) sequence of events can thus be characterized as a number of event queues in a time window defined by the start time and separated by an interval of time with a potential deviation from the expected interval that is within the time delta. Depending upon implementation-specific, configuration-specific, or other factors, an activity can have multiple different periodicities, which can be tracked separately and correlated.

In a specific implementation, the interval and time delta values are implemented as a minimum interval and the time delta as the maximum time after the minimum interval during which a periodic event occurs (e.g., the start time of a next event must occur at the time of the indicated interval or after the indicated interval, but before the time of the interval+time delta). In an alternative, the interval is implemented as a maximum interval and the time delta as a time frame before the maximum interval. As yet another alternative, the interval is implemented as a predicted interval and the time delta as an acceptable time before or after the predicted interval during which a periodic event occurs (and, in this alternative, the time delta may or may not have two values, one for before the indicated interval and one for after).

The IoT signal generation engine 604 uses signal features in the IoT signal features datastore 602 and context from the background event context datastore 606 to generate a signal. The background event context datastore 606 is intended to represent a datastore that includes an IoT device identifier (ID), an application ID, and volume; background event context may or may not also include a user ID and a source ID. In an alternative, a domain datastore (see, e.g., FIG. 5) could explicitly embed background event context in signal features, rendering the background event context datastore 606 logically a part of the IoT signal features datastore 602.

A signal can be defined as a time-correlated one or more events on an activity timeline above an event relevance threshold. In a specific implementation, the event relevance threshold is trained from samples. Depending upon implementation, configuration, or other factors, parameters can affect the event relevance threshold (e.g., a different threshold could be applied for different features). (As is mentioned later, an activity can be defined as a time-correlated one or more events on an activity timeline, plus context.) In a specific implementation, signal(s) are represented as an application-specific Boolean array for an IoT device and source over the time span. Because, in this specific implementation, the signals are application-specific, events correlated with a first application are not part of the array of a second application.

The IoT signal generation engine 604 stores signals in the signal datastores 608. For illustrative convenience, the signal datastores 608 are represented as multiple distinct datastores 608-1 to 608-$n$, each of which are intended to represent signals associated with a specific application, IoT device, and source. Signals that are not periodic can be treated as noise for the purpose of periodicity discovery (though they may, of course, be relevant for other aspects of IoT network analysis or security). In a specific implementation, the data structures of the signal datastores 608 include Boolean arrays corresponding to (historical) events that are fed one-by-one into the periodicity discovery engine 610.

The periodicity discovery engine 610 is intended to represent an engine that analyzes various time spans associated with an IoT device, application, and source to discover periodicities associated with the IoT device, application, and source. Advantageously, because the periodicity discovery engine 610 analyzes various time spans, it is possible to detect periodicity within a first time span that is not necessarily repeated across a second time span. For example, an activity may have a weekly periodicity that would not be detected by a time span of only a day; a security agent may report daily (a first time span) and check for version updates weekly (a second time span), so a single application could have multiple different periodicities detectable over different time spans. As discussed later, this allows for correlation and differing consideration if a first activity (e.g., the daily report) and a second activity (e.g., the weekly check) can no longer be detected as expected.

In a specific implementation, the periodicity discovery engine 610 uses a Fourier transform algorithm to identify periodicities. It is possible to calculate discrete Fourier transform (DFT) of $s_n$ on interval N: $f_k$=K/N, where N is samples, K is segments. A Fourier transform algorithm can be accurate with relatively small intervals, but this is not absolutely necessary in IoT applications because IoT is relatively stable (and a DFT cannot distinguish signal from noise). Accordingly, as has been advantageously confirmed via experimentation, a potentially more desirable alternative is using p-score on its own or a PSD or non-gaussian distribution (used to find where a peak could be) after DFT.

With a p-score based algorithm, a timeline, T, is divided into segments, K, for samples, N. Notable formulas understandable to one of skill in the relevant art include $P_i$= (segments in timeslot i)/K and $P_k$=$\Delta t/f_k$, where $\Delta t$=5 minutes, 1 hour, or 1 day (or some other time span deemed to be useful), k=n samples in series, K·n=N, and $f_k$=K/N. In an example of operation, assume period is 'n' (note: n is sample interval $s_0$ to $s_1$ to $s_{n-1}$, where i is sample interval index, and P{i}=S/K, where S is number of segments in $s_i$) and try for n=1 to perhaps a week's-worth of samples; use probability to determine start time.

One could also use exponential distribution or other regression algorithms. For example, as another alternative, one could use auto-correlation (time series correlation) alone to find a relationship with a delayed copy. After shifting signals and checking the number of signals, shifting will produce the same number of larger magnitude signals if there is overlap. This technique could also be used in combination with other algorithms. In any case, a threshold is trained from samples and incorporated into the algorithm to enable detection of signals as illustrated in the example of FIG. 7.

Figure 7:
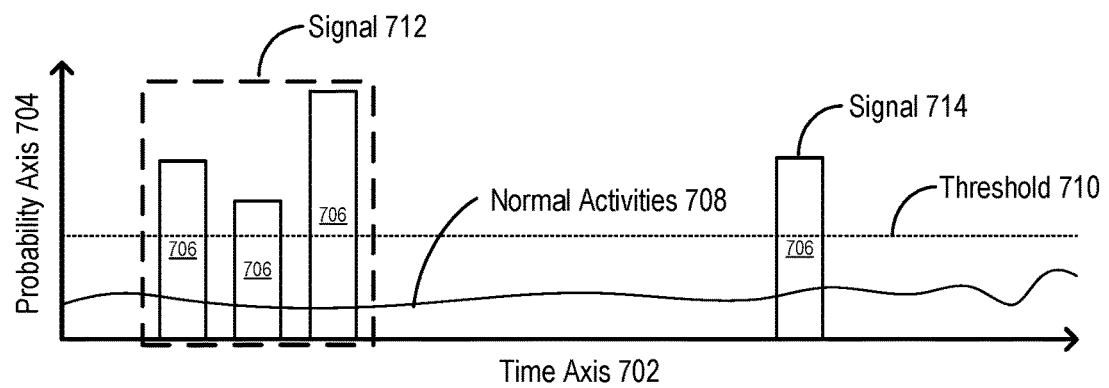
FIG. 7 depicts a graph illustrative of event detection over time.

FIG. 7 depicts a graph 700 illustrative of event detection over time. The graph 700 includes a time axis 702 and a probability axis 704. As time passes, events occur, which can be represented as spikes or rectangles on the graph with a start and stop time conceptually commensurate with a unit on the time axis 702. Wider events can be characterized, depending upon the desired conceptualization, as transmitting more bytes or more messages. Taller events can be characterized as being more distinctive (e.g., more anomalous), which can be conceptually correlated with a unit on the probability axis 704.

For illustrative purposes, the graph 700 has been populated with events 706 and normal activities 708. The events 706 are distinguishable from the normal activities 708 because they exceed the threshold 710. In the example of FIG. 7, some of the events 706 are components of a signal 712 associated with an activity (e.g., FTP). Other events 706 are components of a signal 714 associated with some other activity (in the example of FIG. 7, the signal 714 comprises a single event in the illustrated timeline). The normal activities 708 can be characterized as "background activities," which are those for which feature values will not exceed the threshold 710. Background activities, which can include normal events that happen all the time, will become contextual in the sense that they can be used to figure out what constitutes an anomalous activity. As FIG. 7 illustrates, a signal can be characterized as a time-correlated one or more events on an activity timeline above a threshold. While a signal can be associated with an "activity," it should be understood activities are time-correlated one or more events on an activity timeline in context, so while the term activity can be used to describe a signal because it will eventually be identified as an activity, the activity may or may not have yet been fleshed out for the signal.

Referring once again to the example of FIG. 6, the output of the periodicity discovery engine 610 is actual periodicities of a specific IoT device, source, and application, which are stored in the periodic activity instance datastore 612. At this stage, a start time value, an end time value, an interval value, and an interval fluctuation (referred to herein as a time delta) value are recognized for a given signal having characteristics that fall within the indicated parameters (though the end time remains null until the activity actually ceases). Periodic activity instance descriptors can be defined as the data structures stored in the periodic activity instance datastore 612 that describe an activity using its start time, end time, interval, and time delta.

The periodic activity generation engine 614 is intended to represent an engine that uses the external context datastores 616 to generate periodic activity data structures for storage in the periodic activity datastore 618. In a specific implementation, the periodic activity generation engine 614 performs cross-feature correlation and grouping to form an identified activity. Events can be grouped by device, application, source IP, transmission volume, or the like. A purpose of grouping is to find relevant signals. Thus, an activity can be defined as a relevant signal plus context (e.g., an FTP login). Advantageously, the periodic activity generation engine 614 can detect not only the periodicity of an activity, but the periodicity of context, as well.

As mentioned above, periodic activities can be associated with a security agent with activities having different periodicities. Also, profiling group behavior helps find anomalous periodicity when one IoT device of a group has different periodicities from others in the group, whether due to absence of periodicity (e.g., nine IoT devices of a group have a periodicity a tenth IoT device does not, which may identify misclassification of the IoT device, configuration issues, malicious activity, an IoT device repurposed to do something other than expected, or the like, resulting in an IoT device being reported as exhibiting anomalous behavior); unknown periodicity (e.g., an IoT device has a three hour repeating pattern of messages to an unknown domain indicative of an unauthorized installation, malicious software, or the like); or change of periodicity (e.g., an IoT device starts sending messages three times a day instead of daily, which can be indicative of a configuration change, an activity change (such as reporting more frequently because data is accumulating more frequently), patch/version changes not responding to auto-install, moving a machine so that it makes more frequent home calls indicative of a network configuration failure and, hence, more attempts to call home).

In a specific implementation, machine learning, and in a more specific implementation, clustering, is used to convert a signal into an activity (e.g., using clustering and then labeling each group).

In a specific implementation, the periodic activity generation engine 614 correlates with external context, such as other IoT service activities (e.g., one application could trigger another). The external context datastores 616 include, for example, network environment (e.g., VLAN segmentation) parameters, active scan results (e.g., a list of discoveries/vulnerabilities), device personality (e.g., OS, firmware, vendor, identity, type, behavior), endpoint status (e.g., Symantec endpoint solution integrated with API to learn what happens on a device), reputation intel (e.g., IP address reputation; category, such as business, AWS, entertainment, etc.; threats by device type, version, etc.; and/or published device vulnerability or characteristics), application activity (e.g., of an application associated with a relevant event), user info, or the like. Some of these parameters can instead or in addition (e.g., redundantly) be considered background event context. The external context datastores 616 can be characterized as including data that can be derived from non-active signals; the context extraction engine 620 is intended to represent an engine that extracts such context. In a specific implementation, context extraction and signal generation is performed in parallel. External context may be different for each signal, so the external context datastores 616 are represented as multiple conceptually distinct datastores 616-1 to 616-n.

In a specific implementation, activity generation entails generation of an activity definition, which includes a list of features and value ranges (and can be characterized as a classifier). The generated activity descriptor can include an activity ID (or periodic activity ID, which is obtained after periodicity is detected and used as a handle, generally for the benefit of a human administrator), multi-dimensional consolidated feature values, feature value ranges (e.g., low, average, high), device ID, application ID, user ID (who triggered the activity), sampling intervals (predefined aggregation interval of, e.g., 5 minutes, 1 hour, 1 day, or the like), feature class, feature group, feature priorities, algorithm used to classify activity, timestamp, time interval, and time delta, to name several parameters. Multi-dimensional means there are multiple features in a model to identify periodicity and multiple correlated periodicities.

The anomalous periodic activity IoT network threat assessment engine 120 is intended to represent an engine that tracks periodic activities over time. If an expected periodic activity is not detected, its lack is treated as anomalous and the anomalous periodic activity IoT network threat assessment engine 120 generates an alert. External context can help a human or artificial agent gauge threat level, which may influence whether an alert is raised. It is possible to have both malicious repeating patterns and benign repeating patterns. (Previously undefined periodic activities can also be considered anomalous, but detecting previously undefined periodic activities can be considered part of the function of the periodic activity generation engine 116, which can define the activity as malicious or benign.) Advantageously, utilizing the activity descriptor, the anomalous periodic activity IoT network threat assessment engine 120 can use anomaly detection to detect periodic variation. In operation, the anomalous periodic activity IoT network threat assessment engine 120 performs ripple detection, which is the detection of a constructive heartbeat associated with IoT devices that exhibit periodic behavior that heretofore had simply rippled undetected across the IoT network.

Figure 8:
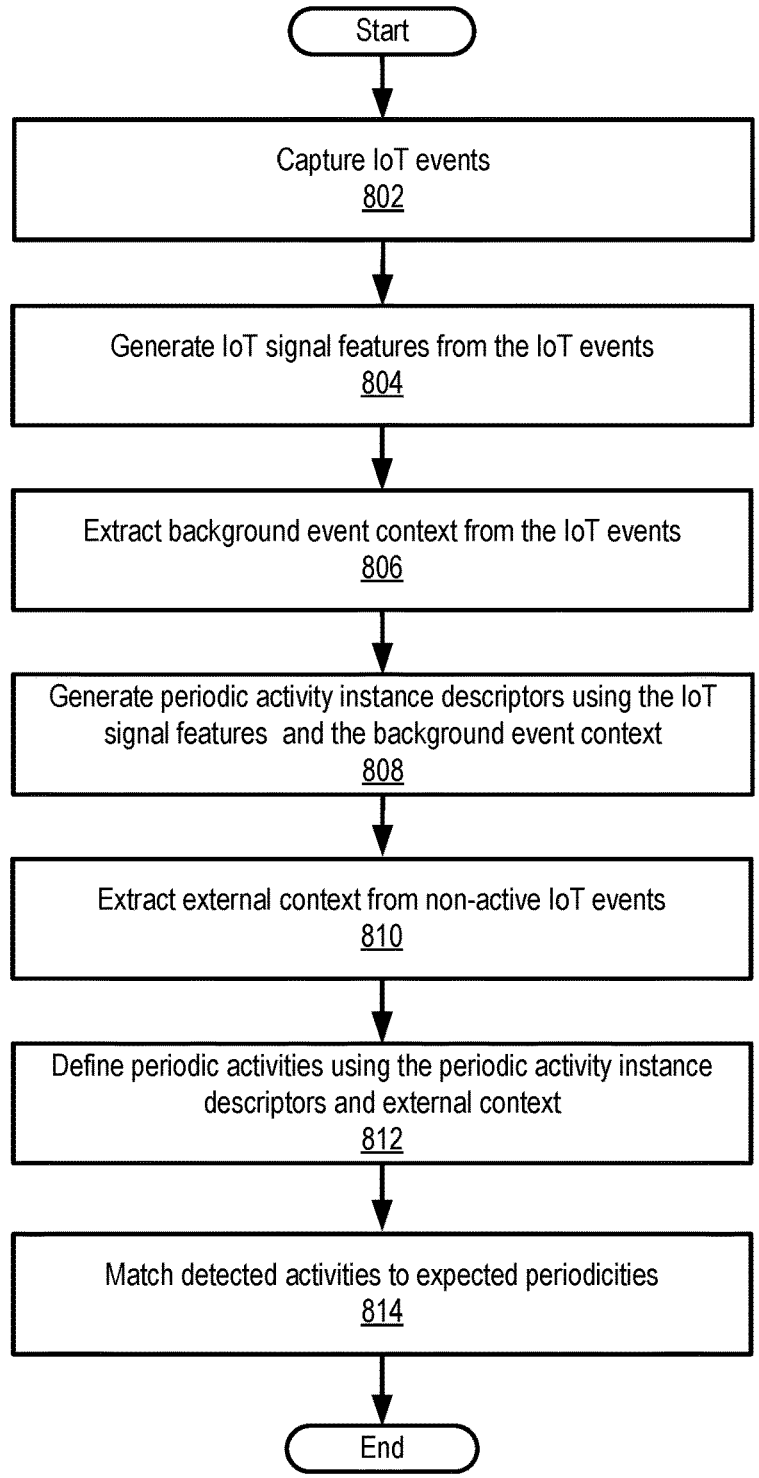
FIG. 8 depicts a flowchart of an example of a method for IoT periodic activity learning.

FIG. 8 depicts a flowchart 800 of an example of a method for IoT periodic activity learning. The flowchart 800 and other flowcharts described in this paper have modules that can be sequentially reordered or reorganized into parallel sequences if applicable.

The flowchart 800 begins at module 802, where IoT events, at least some of which are associated with a first IoT device and a first IoT application, are captured. In a specific implementation, the events are detected via passive monitoring. A rather trivial type of detected discrete events are perhaps messages to or from a first IoT device to a first IoT application controller. It may be desirable to focus on detecting discrete events that take relatively few resources to characterize, such as information in a packet header, though other more resource-intensive techniques, such as deep packet inspection (DPI), can be used to obtain even more event data. Depending upon implementation-specific and other considerations, events used later for the purpose of IoT application learning or IoT application activity orchestration may or may not comprise only discrete events. In any case, activities are a labeled collection of events. A rather trivial example of aggregated, as opposed to discrete, events is a collection of heartbeat messages transmitted periodically by a first IoT device and treated as a single (aggregated) event. However, aggregated events can be much more complex and even incorporate data that would not necessarily be associated with the first IoT device (or the first IoT application controller), but would be used for a determination that a correlation between the first IoT application and an otherwise unrelated event has been identified. In a specific implementation, discrete events are aggregated to form aggregated events using machine learning. Common factor aggregation is a way to apply various different machine learning and deep learning algorithms by focusing on common factors (like all devices of same profile, same OS, using Windows, using telnet, all devices talking to a specific subnet, to name several) as applied to both detected and modeled behavior. For example, session events can be aggregated. In another example, streaming events can be aggregated. The events can be aggregated locally with respect to the first IoT application. For example, the events can be aggregated to form the aggregated events by a device implemented as part of a LAN with the first IoT device. It should be noted that aggregated events that are labeled may be referred to as "activities" in this paper, but more generally, activities are a labeled collection of one or more events, which can be discrete or aggregated. The module 802 can be carried out by an event capture engine, such as the event capture engine 108 of FIG. 1.

The flowchart 800 continues to module 804, where IoT signal features are generated from the IoT events, at least some of which are associated with activities of the first IoT device and the first IoT application. One or more of the IoT signal features can serve as a signature of the first IoT device and the first IoT application. Conceptually, activities can be characterized as streaming, file upload, management, or the like, along with features and/or dominant trends (e.g., for a security camera application, streaming may be dominant). In a specific implementation, the universe of activities is distilled into a relatively small set (e.g., defined activities can be limited to a hundred or fewer generally human-readable aggregated events, such as login, authentication, update request, download, install, etc.). In a specific implementation, a plurality of lightweight engines focus on a respective plurality of activities (e.g., downloads) or a relatively common subset of an activity (e.g., Windows® downloads). Each of these activities will have a set of signal features that are applicable to them. The module 804 can be carried out by an IoT signal feature generation engine, such as the IoT signal feature generation engine 112 of FIG. 1.

The flowchart 800 continues to module 806 where background event context is extracted from the IoT events. The module 806 can be carried out by an IoT signal feature generation engine, such as the IoT signal feature generation engine 112 of FIG. 1.

The flowchart 800 continues to module 808 where periodic activity instance descriptors are generated using the IoT signal features and background event context. The module 808 can be carried out by a periodic activity definition engine, such as the periodic activity definition engine 116 of FIG. 1 or by a periodicity discovery engine, such as the periodicity discovery engine 610 of FIG. 6.

The flowchart 800 continues to module 810 where external context is extracted from non-active IoT events. Non-active IoT events are those events that are not part of the IoT signal under consideration. The module 810 can be carried out by a periodic activity definition engine, such as the periodic activity definition engine 116 of FIG. 1 or by a context extraction engine, such as the context extraction engine 620 of FIG. 6.

The flowchart 800 continues to module 812 where periodic activities are defined using the periodic activity instance descriptors and external context. The module 812 can be carried out by a periodic activity definition engine, such as the periodic activity definition engine 116 of FIG. 1 or by a periodic activity generation engine, such as the periodic activity generation engine 614 of FIG. 6.

The flowchart 800 continues to module 814 where detected activities are matched to expected periodicities. The flowchart 800 is intended to represent a continuous flow in which the same events that are analyzed to determine periodicities are also matched to expected periodicities. It may be noted, however, that machine learning techniques used to determine periodicities may occur off-line, while matching a signal to a known periodicity may occur in real time. If detected activities cannot be matched to an expected periodicity, an alert may be generated indicating the expected periodic activity was not detected. If this failure occurs from once to a given number of times, depending upon preferences, an alert can be generated indicating the expected periodic activity has ceased. Detected activities can also be matched to known malicious periodic activities and an alert can be generated upon a match. Thus, "anomalous" can refer to the lack of an expected periodic event or the presence of a periodic event that is in violation of policy. The module 814 can be carried out by an anomalous periodic activity IoT network threat assessment engine, such as the anomalous periodic activity IoT network threat assessment engine 120.

The techniques described in the preceding text and figures can be mixed and matched as circumstances demand to produce alternative implementations.

The invention claimed is:

1. A method comprising:
capturing, by an event capture engine configured to listen for communications, a plurality of IoT events associated with a first IoT device, at least in part by analyzing at least one packet associated with a first communication that involves the first IoT device;
generating a plurality of IoT signal features from the plurality of IoT events, wherein:
at least some of the plurality of IoT signal features are associated, collectively, with a first activity of the first IoT device and a second activity of the first IoT device;
the plurality IoT signal features include: a start time value, an end time value, an interval value, and an interval fluctuation;
a set of the plurality of IoT signal features are usable as a signature of the first IoT device and a first IoT application;
the first activity of the first IoT device comprises a plurality of events and wherein the second activity of the first IoT device comprises a single event; and
at least some of the plurality of signal features are clustered, using machine learning, into a group that is labeled as the first activity of the first IoT device;
extracting background event context from first and second IoT events;
generating a set of periodic activity instance descriptors based on the plurality of IoT signal features and the background event context, wherein the set of periodic activity instance descriptors comprises data structures that describe an activity of the first IoT device using the start time value, the end time value, the interval value, and the interval fluctuation;
identifying a respective different first and second periodic activity of the first IoT device based on the set of periodic activity instance descriptors and external context;
determining that an expected periodicity of at least one of the first and second periodic activities of a second IoT device is an anomalous periodicity, at least in part by comparing an observed interval to a periodic activity instance descriptor included in the set of periodic activity instance descriptors of the first IoT device to a periodic activity instance descriptor included in a set of periodic activity instance descriptors of the second IoT device; and
taking a remedial action in response to detecting the anomalous periodicity, including by concluding, based at least in part on the anomalous periodicity, that the second IoT device is at least one of: (1) erroneously misclassified as sharing classification of the first IoT device, (2) has been moved or repurposed to do something other than expected, and (3) has not responded to patch or version changes, and enforcing a policy against the second IoT device based on the conclusion.

2. The method of claim 1, wherein taking the remedial action further includes generating an alert that indicates that a periodicity of a detected activity of the first IoT device cannot be matched to an expected periodicity.

3. The method of claim 1, wherein taking the remedial action further includes generating an alert that indicates that a periodicity of a detected activity of the first IoT device matches an expected periodicity of a periodic activity known to be malicious.

4. The method of claim 1, wherein taking the remedial action further includes generating an alert that indicates that an expected periodic activity of the first IoT device fails to occur.

5. The method of claim 1, wherein the expected periodicity is determined using a Fourier transform algorithm, a p-score based algorithm, or an exponential distribution algorithm.

6. The method of claim 1, wherein the expected periodicity is determined using time series correlation.

7. The method of claim 1, wherein the set of periodic activity instance descriptors are generated using normalization techniques.

8. The method of claim 1, wherein the set of periodic activity instance descriptors includes one or more of an activity ID, a periodic activity ID, multi-dimensional consolidated feature values, feature value ranges, device ID, application ID, user ID, sampling intervals, feature class, feature group, feature priorities, algorithm used to classify activity, timestamp, interval value, and interval fluctuation value.

9. A system comprising:
a processor configured to:
capture a plurality of IoT events associated with a first IoT device, at least in part by analyzing at least one packet associated with a first communication that involves the first IoT device;
generate a plurality of IoT signal features from the plurality of IoT events, wherein:
at least some of the plurality of IoT signal features are associated, collectively, with a first activity of the first IoT device and a second activity of the first IoT device;
the plurality of IoT signal features include: a start time value, an end time value, an interval value, and an interval fluctuation;
a set of the plurality of IoT signal features are usable as a signature of the first IoT device and a first IoT application;
the first activity of the first IoT device comprises a plurality of events and wherein the second activity of the first IoT device comprises a single event; and
at least some of the plurality of IoT signal features are clustered, using machine learning, into a group that is labeled as the first activity of the first IoT device;
extract background event context from first and second IoT events;
generate a set of periodic activity instance descriptors based on the plurality of IoT signal features and the background event context, wherein the set of periodic activity instance descriptors comprises data structures that describe an activity of the first IoT device using the start time value, the end time value, the interval value, and the interval fluctuation;
identify a respective different first and second periodic activity of the first IoT device based on the set of periodic activity instance descriptors and external context;
determine that an expected periodicity of at least one of the first and second periodic activities of a second IoT device is an anomalous periodicity, at least in part by comparing an observed interval to a periodic activity instance descriptor included in the set of periodic activity instance descriptors of the first IoT device to a periodic activity instance descriptor included in a set of periodic activity instance descriptors of the second IoT device; and take a remedial action in response to detecting the anomalous periodicity, including by concluding, based at least in part on the anomalous periodicity, that the second IoT device is at least one of: (1) erroneously misclassified as sharing classification of the first IoT device, (2) has been moved or repurposed to do something other than expected, and (3) has not responded to patch or version changes, and enforcing a policy against the second device based on the conclusion; and a memory coupled to the processor and configured to provide the processor with instructions.

10. The system of claim 9, wherein taking the remedial action further includes generating an alert that indicates that a periodicity of a detected activity of the first IoT device cannot be matched to an expected periodicity.

11. The system of claim 9, wherein taking the remedial action further includes generating an alert that indicates that a periodicity of a detected activity of the first IoT device matches an expected periodicity of a periodic activity known to be malicious.

12. The system of claim 9, wherein taking the remedial action further includes generating an alert that indicates that an expected periodic activity of the first IoT device fails to occur.

13. The system of claim 9, wherein the expected periodicity is determined using a Fourier transform algorithm, a p-score based algorithm, or an exponential distribution algorithm.

14. The system of claim 9, wherein the expected periodicity is determined using time series correlation.

15. The system of claim 9, wherein the set of periodic activity instance descriptors are generated using normalization techniques.

16. The system of claim 9, wherein the set of periodic activity instance descriptors include one or more of an activity ID, a periodic activity ID, multi-dimensional consolidated feature values, feature value ranges, device ID, application ID, user ID, sampling intervals, feature class, feature group, feature priorities, algorithm used to classify activity, timestamp, interval value, and interval fluctuation value.

* * * * *